United States Patent
Napora et al.

(10) Patent No.: US 8,356,454 B2
(45) Date of Patent: Jan. 22, 2013

(54) UNITIZED OVERHEAD GLAZING SYSTEMS

(75) Inventors: Nicholas A. Napora, Broadway, VA (US); Vincent T. Van Son, Maryville, TN (US)

(73) Assignee: Alcoa Inc., Pittsburgh, PA (US)

( * ) Notice: Subject to any disclaimer, the term of this patent is extended or adjusted under 35 U.S.C. 154(b) by 49 days.

(21) Appl. No.: 12/903,831

(22) Filed: Oct. 13, 2010

(65) Prior Publication Data

US 2011/0162315 A1   Jul. 7, 2011

Related U.S. Application Data

(60) Provisional application No. 61/251,066, filed on Oct. 13, 2009.

(51) Int. Cl.
*E04B 1/00* (2006.01)
*E04G 23/02* (2006.01)

(52) U.S. Cl. ..... 52/747.1; 52/745.19; 52/235; 52/745.2; 52/506.1; 52/653.1; 52/210; 52/204.62

(58) Field of Classification Search ............ 52/306–308, 52/210–213, 204.1, 204.5, 214, 447, 204.61, 52/204.62, 204.69, 204.7, 456, 223.7, 475.1, 52/601, 664, 667, 633, 656.5, 653.1, 506.1–506.09, 52/507–510, 512–513, 235, 663–669, 745.05–745.12, 52/747.1, 745.19, 745.2, 747.11, 745.15, 52/199–200

See application file for complete search history.

(56) References Cited

U.S. PATENT DOCUMENTS

| | | | | |
|---|---|---|---|---|
| 3,321,880 | A * | 5/1967 | Ferrell et al. | 52/235 |
| 4,207,717 | A * | 6/1980 | Hubbard | 52/235 |
| 4,850,167 | A * | 7/1989 | Beard et al. | 52/200 |
| 4,899,508 | A * | 2/1990 | Biebuyck | 52/235 |
| 5,381,637 | A * | 1/1995 | Farag | 52/204.595 |
| 5,452,552 | A * | 9/1995 | Ting | 52/235 |
| 5,510,575 | A * | 4/1996 | Weibler | 174/381 |
| 5,675,948 | A * | 10/1997 | Boesch | 52/209 |
| 6,338,226 | B1 * | 1/2002 | Gauthier et al. | 52/63 |
| 6,672,018 | B2 * | 1/2004 | Shingleton | 52/173.3 |
| 7,373,763 | B2 * | 5/2008 | Voegele et al. | 52/308 |
| 7,526,901 | B2 * | 5/2009 | Voegele et al. | 52/308 |

* cited by examiner

*Primary Examiner* — Jeanette E. Chapman
(74) *Attorney, Agent, or Firm* — Greenberg Traurig, LLP

(57) ABSTRACT

In an embodiment, a unitized overhead glazing system of the present invention includes an array of assembled structural framing cassettes each having at least five photovoltaic modules. In an embodiment, each cassette forms one electrical string and is pre-wired, tested, and shipped ready to install for a variety of applications, including, but not limited to, parking canopies, covered walkways and specialty awnings. The unitized overhead glazing system can be utilized to generate electricity, provide shade, collect water, reduce heat island effect, provide more controlled lighting and support infrastructure for plug-in vehicles. The unitized overhead glazing system is designed to be installed and maintained from below, eliminating safety concerns associated with conventional canopies where work must be performed while on top of the canopy. The unitized overhead glazing system incorporates sealing methods and components to manage water, limit debris build up, and maximize energy yield.

19 Claims, 10 Drawing Sheets

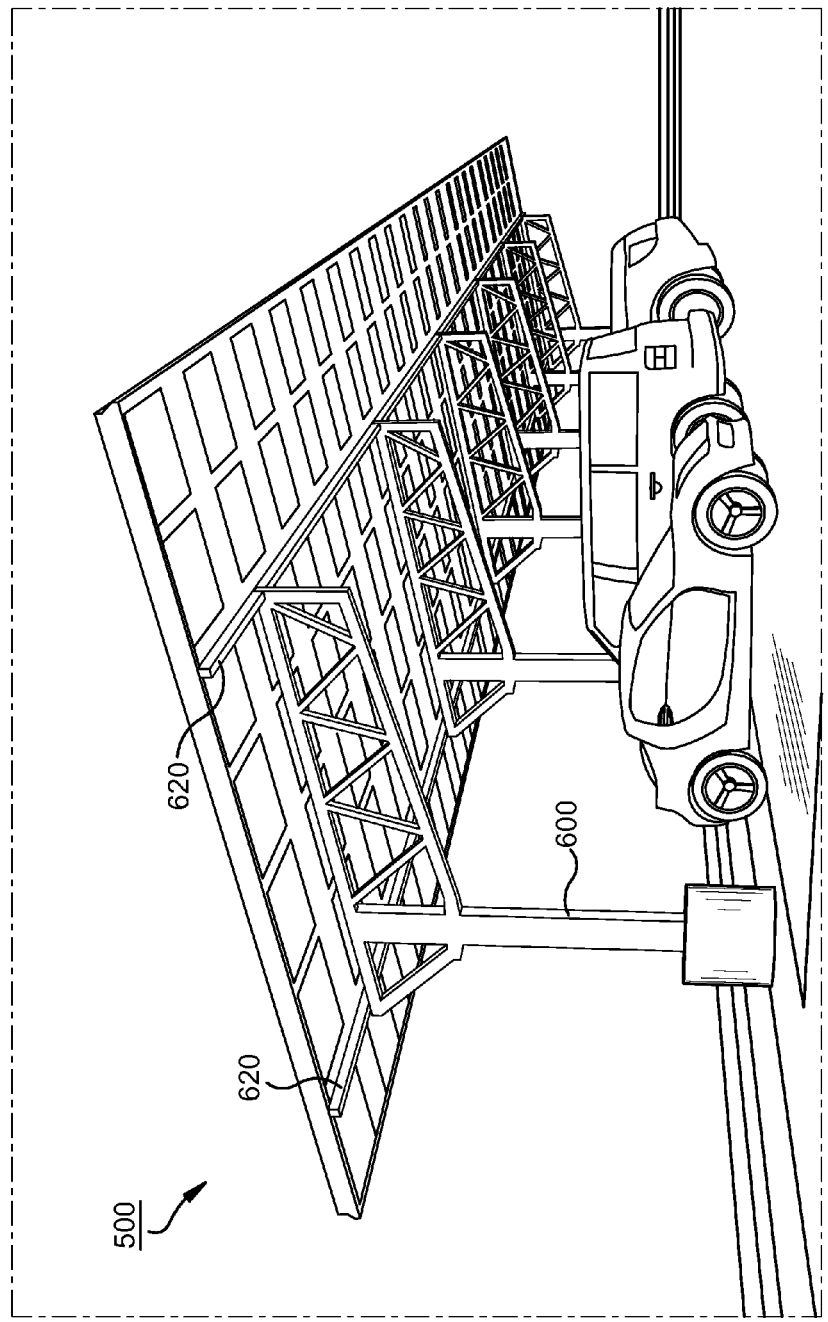

UNITIZED OVERHEAD GLAZING SYSTEMS

RELATED APPLICATIONS

This application claims the benefit of U.S. Provisional Application Ser. No. 61/251,066, filed Oct. 13, 2009, the entirety of this application is hereby incorporated herein by reference for the teachings therein.

BACKGROUND

Conventional overhead glazing systems for walkways, canopies, and the like, generally include a plurality of horizontal framing members or purlins and vertical framing members or rafters interconnected to form a structural framing unit and a top mounted pressure plate for retaining glazing panels in place against the framing unit. Typically, these conventional overhead glazing systems are assembled on-site, and the glazing panels are installed from above. Further, these conventional systems commonly utilize exterior fasteners, slots, sealing devices and holes for installing, maintaining and replacing panels.

SUMMARY

Unitized overhead glazing systems are disclosed herein.

According to aspects illustrated herein, in an embodiment a unitized overhead glazing system of the present invention includes at least one assembled structural framing cassette, wherein the assembled structural framing cassette comprises a plurality of interconnected purlins and rafters forming a plurality of glazing openings; at least one glazing panel retained in at least one of the glazing openings; and at least one reverse pressure plate engaging a lower surface of a purlin forming the glazing opening holding the glazing panel; and a substructure supporting all or part of at least one structural framing cassette. In an embodiment, the assembled structural framing cassette includes at least five glazing openings. In an embodiment, the assembled structural framing cassette includes at least six glazing openings. In an embodiment, the assembled structural framing cassette includes at least seven glazing openings.

In an embodiment, a structural framing cassette of the present invention is fabricated off-site in a shop, and includes a plurality of interconnected purlins and rafters which form a plurality of glazing openings. In an embodiment, an assembled structural framing cassette of the present invention is fabricated in the shop, and includes a plurality of interconnected purlins and rafters which form a plurality of glazing openings; at least one glazing panel retained in at least one of the glazing openings; and at least one reverse pressure plate engaging a lower surface of a purlin forming the glazing opening holding the glazing panel. As assembled structural framing cassettes can be subsequently engaged together, individual cassettes can be shipped to a project location as a unitized system, pre-assembled. This can reduce the time it takes to install the system, as compared to conventional systems. Additionally, there is no need to use top mounting pressure plates to help maintain the glazing panels in place. This enables the top surface of the unitized system to be flat and smooth which can improve panel cleanliness as water and/or debris can be shed more easily. The flush top surface also can prevent the glazing panels from being shaded by a traditional top mounted pressure plate and cover, and their performance reduced by the shade. The unique design of an overhead unitized glazing system of the present invention eliminates the need for structural members to be directly beneath the underside of the glazing panels. This may be important in applications where the glazing panels consist of solar photovoltaic apparatus that can benefit from light reflected from below such as bifacial solar photovoltaic panels, laminates, or modules and solar thermal panels. In such applications the amount of electricity generated or energy captured is maximized if nothing obstructs light from reaching the underside. A unitized overhead glazing system of the present invention can be installed at the on-site project location without the need of having to work from above or atop the overhead system. If a glazing panel needs to be removed or replaced at the on-site location, this can be done without having to remove other panels or without significantly disassembling the entire system. Similarly, the glazing panel can be removed or replaced by working from below (bottom-up). The individual cassettes can be hoisted and set into place with minimal labor and or specialty hardware or equipment.

According to aspects illustrated herein, in an embodiment a method for replacing a first glazing panel of an assembled structural framing cassette includes providing a replacement glazing panel, wherein the assembled structural framing cassette includes a plurality of horizontal framing members interconnected with two vertical framing members to provide at least five glazing openings each capable of holding a glazing panel, wherein the replacement glazing panel is approximately same size and shape as the first glazing panel so as to fit within a first glazing opening holding the first glazing panel, wherein the assembled structural framing cassette engages a substructure, and wherein the assembled structural framing cassette has a clearance height of at least about seven feet above a surface level for which the substructure is erected; providing a plurality of retainer clips; detaching at least one reverse mounted pressure plate from the first glazing opening, wherein the reverse mounted pressure plate is detached from a lower surface of the horizontal framing member forming the first glazing opening; removing the first glazing panel from the first glazing opening; engaging the plurality of retainer clips to those framing members that form the first glazing opening so as to provide a support for the replacement glazing panel during installing of the replacement glazing panel in the first glazing opening; and installing the replacement glazing panel in the first glazing opening so as to replace the first glazing panel of the assembled structural framing cassette.

According to aspects illustrated herein, in an embodiment a method for replacing a first glazing panel of a unitized overhead glazing system, the unitized overhead glazing system including at least ten assembled structural framing cassettes, includes providing a replacement glazing panel, wherein the replacement glazing panel is approximately same size and shape as the first glazing panel so as to fit within a first glazing opening of one of the assembled structural framing cassettes holding the first glazing panel, wherein each of the assembled structural framing cassettes includes a plurality of horizontal framing members interconnected with two vertical framing members to provide at least five glazing openings, wherein the unitized overhead glazing system engages a substructure, and wherein the unitized overhead glazing system has a clearance height of at least about seven feet above a surface level for which the substructure is erected; providing a plurality of retainer clips; detaching at least one reverse mounted pressure plate from the first glazing opening, wherein the reverse mounted pressure plate is detached from a lower surface of the horizontal framing member forming the first glazing opening; removing the first glazing panel from the first glazing opening; engaging the plurality of retainer clips to those framing members that form the first glazing opening so as to provide a support for the replacement glazing panel during installing of the replacement glazing panel in the first glazing opening; and installing the replacement glazing panel in the first glazing opening so as to replace the first glazing panel.

According to aspects illustrated herein, in an embodiment a kit of components for use in replacing a first glazing panel of an assembled structural framing cassette includes a replacement glazing panel, wherein the replacement glazing panel is approximately same size and shape as the first glazing panel so as to fit within a first glazing opening of the assembled structural framing cassette holding the first glazing panel, wherein the assembled structural framing cassette includes a plurality of horizontal framing members interconnected with two vertical framing members to provide at least five glazing openings, wherein the first glazing panel is held in place in the first glazing opening using at least one reverse pressure plate fastened to a lower surface of the horizontal framing member forming the first glazing opening, wherein the assembled structural framing cassette engages a substructure, and wherein the assembled structural framing cassette has a clearance height of at least about seven feet above a surface level for which the substructure is erected; and a plurality of retainer clips for engaging those framing members that form the first glazing opening, the plurality of retainer clips providing support to the replacement glazing panel during installation of the replacement glazing panel in the first glazing opening.

A unitized overhead glazing system of the present disclosure finds use in numerous domestic and commercial applications, including, but not limited to, parking lot covers, car ports, caravan ports, bike ports, marina canopies, aircraft canopies, greenhouses, skylights, atriums, awnings, patio covers, play areas, classroom covers, barrel vault canopy, covered walkways, smoking canopies, school canopies, garden center canopies and the like. In an embodiment, a unitized overhead glazing system of the present disclosure finds use as an engineered solar photovoltaic canopy. In an embodiment, the solar photovoltaic canopy enables facility owners pursuing sustainable solutions to make use of the unobstructed and non-contested area above parking areas to, for example, generate electricity, provide shade, collect water, reduce heat island effect, provide more controlled lighting, and support infrastructure for plug-in vehicles. In an embodiment, the solar photovoltaic canopy qualifies for a significant number of Leadership in Energy and Environmental Design (LEED) points by virtue of the design and material selection of the canopy.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

FIG. 10 is a schematic, perspective illustration of a unitized overhead canopy glazing system of the present invention.

Figure 1:
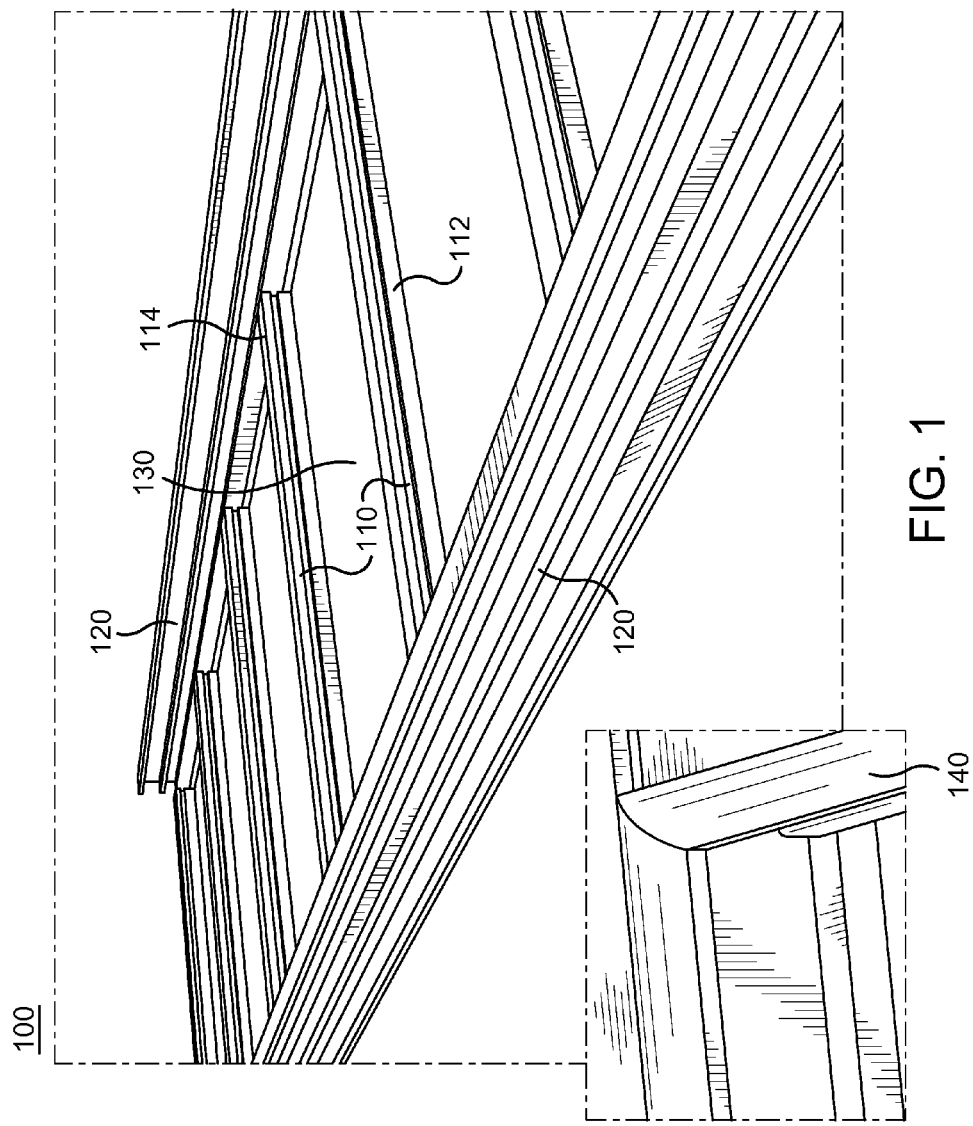
FIG. 1 shows an embodiment of a structural framing cassette of the present invention. The structural framing cassette includes a plurality of purlins interconnected with two rafters to provide at least five glazing openings, each capable of holding a glazing panel.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed invention.

DETAILED DESCRIPTION

As used herein, the terms "glazing panel", "panel" and "module" refer to a frame defining an opening and a panel having a top face and a back face fitted in the frame opening. The panel can be made of any building material, including, but not limited to, glass, plastic, aluminum, aluminum composite material, and solar (photovoltaic or PV) or combinations thereof. The panel may be single or multiple-glazed and may have any desired features, e.g. optical, strength, safety, solar energy control, or other properties, and may be transparent, translucent, opaque, colored, or tinted. In an embodiment, the panel is a Reynobond® Aluminum Composite Material (ACM) panel. In an embodiment, the panel is a solar panel.

As used herein, the term "structural framing cassette" refers to a plurality of horizontal framing members ("purlins") interconnected with two vertical framing members "rafters", to provide a plurality of glazing openings for holding glazing panels. In an embodiment, each structural framing cassette has five, six, seven, eight, nine, ten, eleven, twelve, thirteen, fourteen, fifteen, sixteen, seventeen, eighteen, nineteen or twenty glazing openings. The number of glazing openings in a structural framing cassette of the present invention can vary depending on the desired application. A structural framing cassette of the present invention includes purlins with an upper surface and a lower surface. As used herein, the term "assembled structural framing cassette" refers to a plurality of horizontal framing members ("purlins") interconnected with two vertical framing members "rafters", to provide a plurality of glazing openings for holding a plurality of glazing panels; and a plurality of glazing panels held within the glazing openings.

As used herein, the term "unitized overhead glazing system" refers to a plurality of structural framing cassettes of the present invention joined together and supported by a substructure to form a free standing self supporting overhead glazing system. A unitized overhead glazing system of the present disclosure finds use in numerous domestic and commercial applications, including, but not limited to, parking lot covers, car ports, caravan ports, bike ports, marina canopies, aircraft canopies, greenhouses, skylights, atriums, awnings, patio covers, play areas, classroom covers, covered walkways, smoking canopies, school canopies, garden center canopies and the like. In an embodiment, a unitized overhead glazing system of the present invention has a clearance height of at least about seven feet above a surface level for which the substructure is erected to accommodate, for example, regular-height vehicles. In an embodiment, a unitized overhead glazing system of the present invention has a clearance height of at least about sixteen feet above a surface level for which the substructure is erected to accommodate, for example, oversized vehicles.

As used herein, the term "reverse pressure plate" refers to a plate, pin, clip, or bar that screws to a lower surface of a purlin and/or a rafter of an assembled structural framing cassette of the present invention to retain the glazing panel in position within the glazing opening.

As used herein, the term "retainer clip" refers to a clip able to hold a glazing panel in place during installation and removal, when a reverse pressure plate is not in place to provide this function.

Referring now in more detail to the drawings, FIG. 1 shows an embodiment of a structural framing cassette 100 of the present invention. The structural framing cassette 100 includes a plurality of horizontal framing members ("purlins") 110 interconnected with two vertical framing members "rafters" 120, to provide a plurality of glazing openings 130 for holding a plurality of glazing panels (not illustrated in FIG. 1). The purlins 110 include an upper surface 112 and a lower surface 114 (the structural framing cassette 100 is shown upside down). The structural framing cassette 100 can five glazing openings 130, six glazing openings 130, seven glazing openings 130 or more. In an embodiment, the structural framing cassette 100 has eight, nine, ten, eleven, twelve, thirteen, fourteen, fifteen, sixteen, seventeen, eighteen, nineteen or twenty glazing openings 130. The number of glazing openings 130 in the structural framing cassette 100 of the present invention can vary depending on the desired application.

The rafters 120 and purlins 110 may be made of formed or rolled steel, stainless steel, extruded aluminum, aluminum alloys, wood, plastic, composite materials, combinations thereof, or any other convenient material. In an embodiment, select aluminum alloys can be used on select members (rafters and/or purlins) to improve corrosion resistance and/or mitigate potential for galvanic reaction. In an embodiment, select alloys can be used on select members (rafters 120 and/or purlins 110) to improve the ability of select elements of the structural framing cassette 100 to provide an improved electrical bonding path and simplify electrical grounding and the hardware otherwise required. In an embodiment, steel or other materials can be incorporated into select members (rafters 120 and/or purlins 110) to provide added strength during installation and/or continuous operation. In an embodiment, select members (rafters 120 and/or purlins 110) can be co-extruded. In an embodiment, channels can be formed in the rafters 120 to serve various functions, e.g., collecting condensation and/or liquid runoff, facilitate attaching or integrating lighting, or other devices. In an embodiment, channels can be formed in the purlins 110 to serve various functions, e.g., collecting condensation and/or liquid runoff, facilitate attaching or integrating lighting, or other devices. In an embodiment, trim plates and components can be made from fiberglass or other materials. As illustrated in the close-up picture in FIG. 1, in an embodiment a weather seal gasket 140 is positioned around each of the glazing openings 130 prior to installing glazing panels, although not all embodiments require using a gasket 140. The gasket 140 can be employed to secure the panels and to minimize infiltration of moisture, air, dust, and other elements, from the outside to the inside of the glazing openings 130. In other embodiments, a weather seal gasket 140 is absent.

Figure 2:
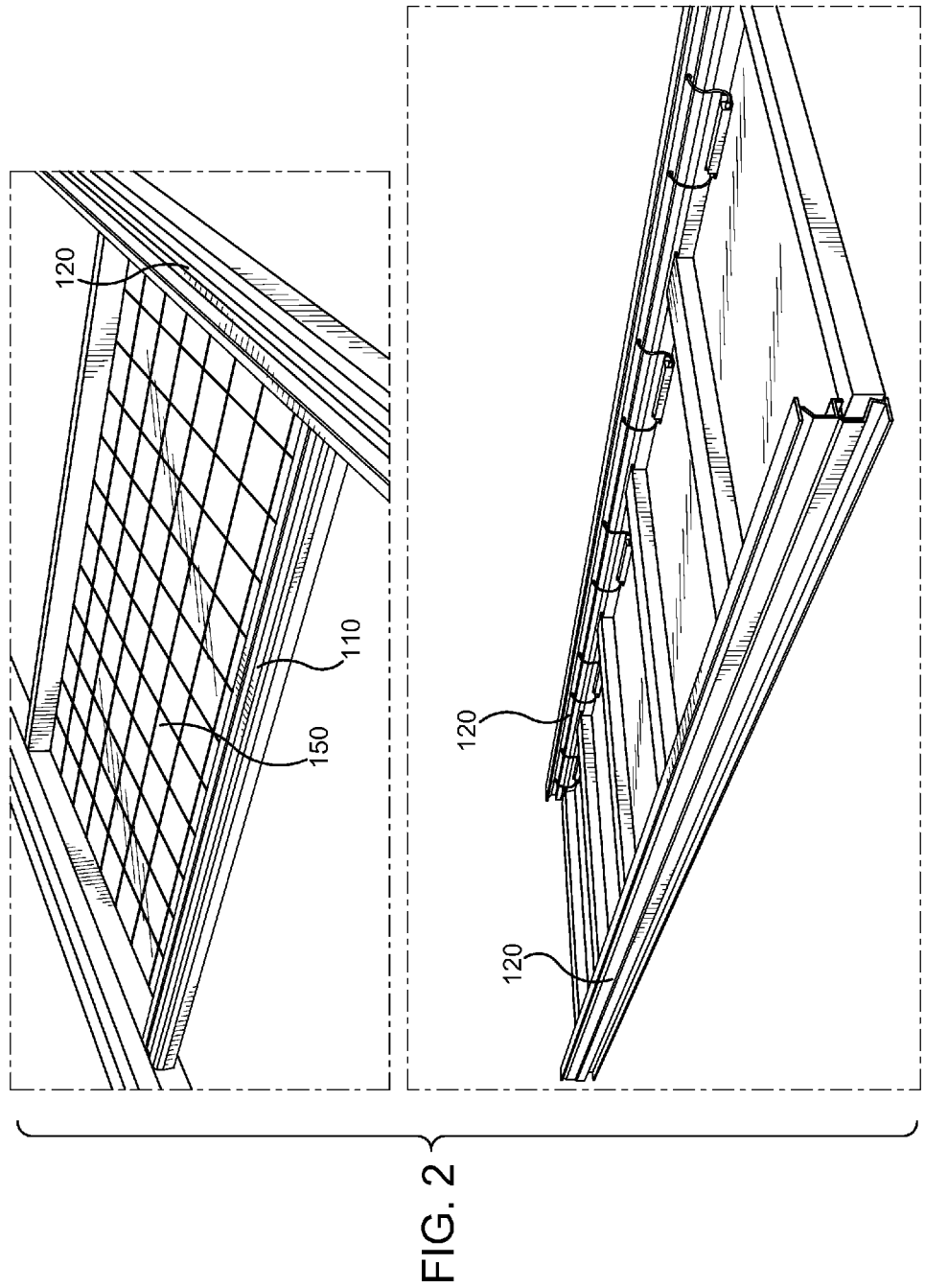
FIG. 2 shows an embodiment of an assembly process for adding glazing panels (here solar panels) to the glazing openings of FIG. 1.

FIG. 2 shows an embodiment of an assembly process for adding glazing panels to the structural framing cassette 100 of FIG. 1. Each glazing opening 130 in the structural framing cassette 100 can hold the same type or different type of glazing panel. Panels may be made of any building material, including, but not limited to, glass, plastic, aluminum, aluminum composite material, and solar (photovoltaic or PV) or combinations thereof. Panels may be single or multiple-glazed and may have any desired features, e.g. optical, strength, safety, solar energy control, or other properties, and may be transparent, translucent, opaque, colored, or tinted. In an embodiment, the panels are Reynobond® Aluminum Composite Material (ACM) panels. In an embodiment, the glazing panels are solar panels 150. For purposes of presenting an embodiment of the present disclosure, the remainder of the application will describe solar panels 150.

In an embodiment the solar panels 150 are of conventional design and are marketed by SANYO Energy (U.S.A.) Corporation, of San Jose, Calif., USA under the designation "Bifacial HIT® Double solar panel." In an embodiment, each of the solar panels 150 comprise a rectangular-shaped photovoltaic module which receives light on both sides including a plurality of solar cells which also receive light on both sides; and an outer frame made of metal such as aluminum or stainless set around the outer circumference of the photovoltaic module. In an embodiment, the solar panel 150 has a back face that generates electricity from ambient light reflected off surrounding surfaces, and combines with power from the front face of the solar panel. In an embodiment, when a solar panel 150 is held in place within a glazing opening 130 of a structural framing cassette 100 of the present invention, the top face of the solar panel 150 will be in direct contact with weather elements including, but not limited to, wind, temperature, pressure, humidity, clouds and precipitation; while the back face will be directly overhead a person or a car that is underneath the structural framing cassette 100. In an embodiment, the outer frame of the solar panel 150 which includes a lip, when combined with the features of the structural framing cassette 100, can eliminate the need for a mechanical stop or pressure plate on the top face of the panel 150. This enables the upper surface of the structural framing cassette 100 to be flat and smooth which can improve panel cleanliness as water and/or debris can be shed more easily. The flush upper surface also can prevent the plurality of solar panels 150 from being shaded by the shadow otherwise caused by a conventional or traditional pressure plate and cover, and their performance reduced by the shade. The unique design of the structural framing cassette 100 eliminates the need for structural members to be directly beneath the underside of the solar panels 150. This is important in applications where the panels are solar panels, where as more light reaches the underside of the solar panels, the amount of electricity that can be generated is maximized.

In an embodiment, a lip can be added to the outer frame of other solar panels, or a specialty frame can be added to other framed solar panels, or other materials to enable the use of the reverse pressure plate/flush mount design disclosed herein. In an embodiment, the frame profile does not include a lip, and instead an integrated pressure plate is incorporated into the rafters of each cassette. This will enable the same design concept to use frameless PV laminate panels (or other materials). In an embodiment, an optional retainer clip holds the solar panel in place during installation and removal when a reverse pressure plate is not in place, for example, the reverse pressure plate has not been installed yet.

Figure 3:
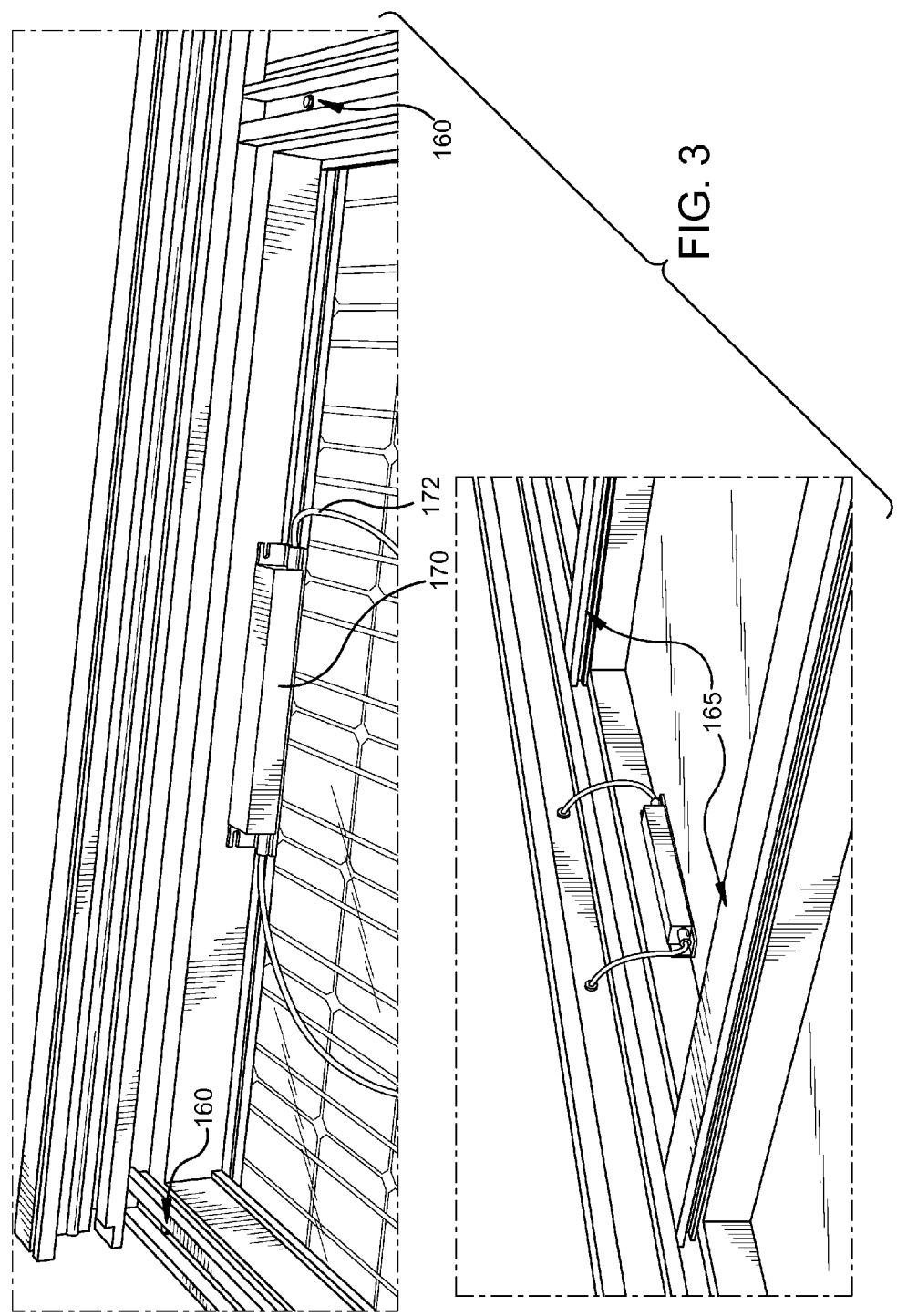
FIG. 3 shows a close-up view of the assembled structural framing cassette of FIG. 2, showing reverse pressure plates engaging a lower surface of the purlins of a glazing opening.
Figure 4:
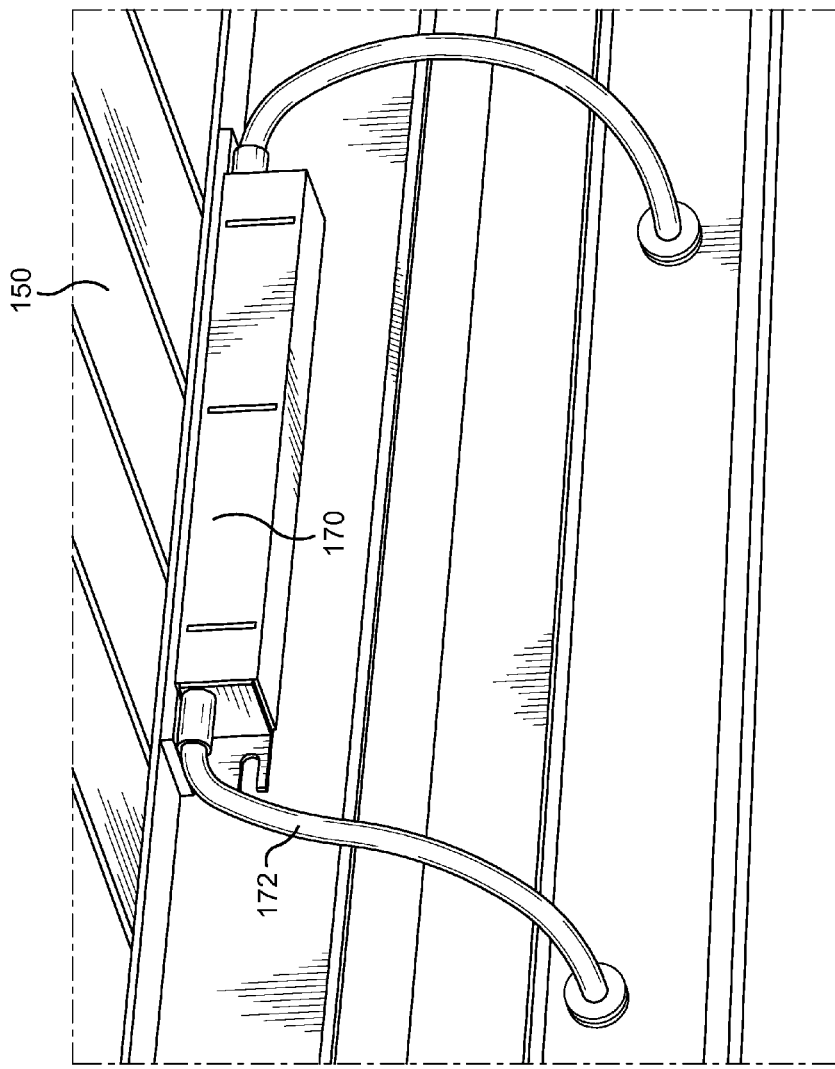
FIG. 4 shows solar panel wires from a single solar panel of FIG. 2 entering a rafter wire chase cover as shown, for example, in FIG. 11D and FIG. 11F.
Figure 5:
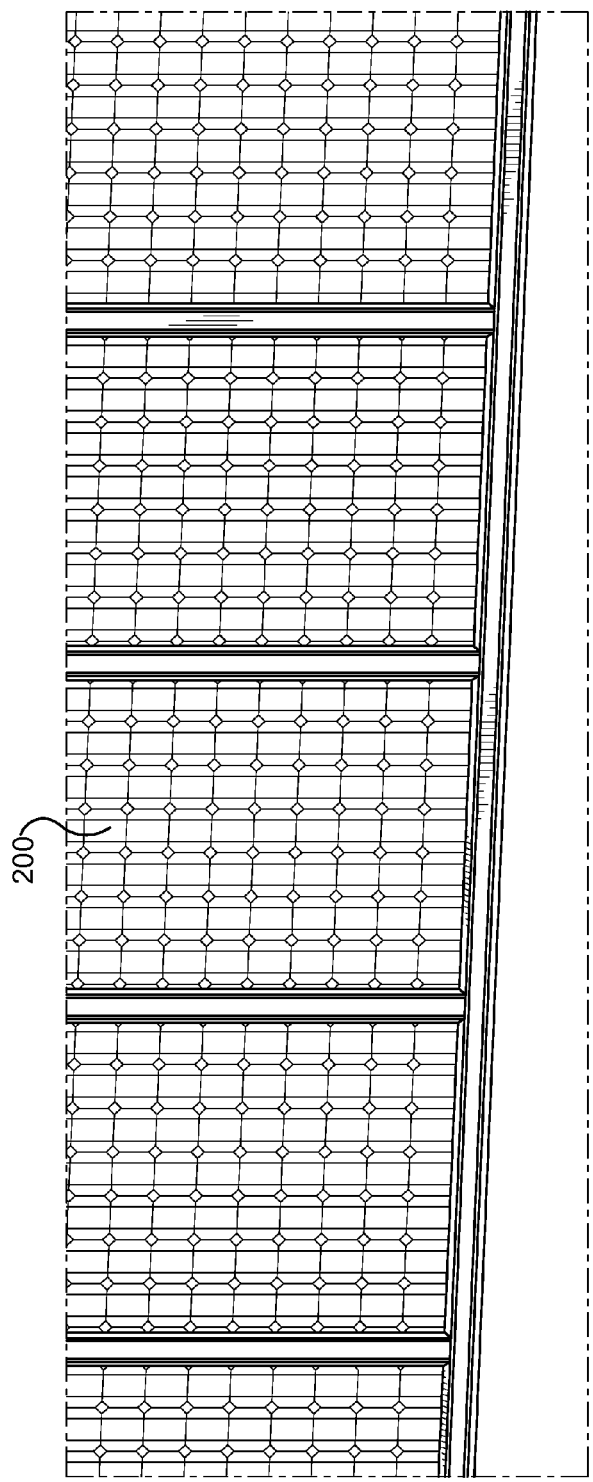
FIG. 5 shows a portion of the structural framing cassette of FIG. 2 after assembly.

As illustrated in FIG. 2, the structural framing cassette 100 can be fully assembled in the shop and reverse pressure plates 160 and screw covers 165 (see FIG. 3) can be attached in the controlled environment of the shop. Although the various drawings/photographs show continuous reverse pressure plate embodiments (i.e., pressure plates 160 that extend along all or most of the purlin 110 length from one rafter 120 to the other rafter 120), it should be appreciated that in some embodiments, the pressure plates 160 do not extend along all or most of the purlin 110 length from one rafter 120 to the other rafter 120, but instead are formed as pins or clips engaging one of the purlins 110 or the rafters 120. As illustrated in FIGS. 2-4, the structural framing cassettes 100 include concealed but accessible wire chase covers 170 to contain solar panel wiring 172 as well as wiring from potential accessories such as LED or other lighting. FIG. 5 shows the flat and smooth upper surface of an assembled structural framing cassette 200 of the present invention (which includes the structural framing cassette 100 and a plurality of solar panels 150). In still other embodiments, reverse pressure plates are absent in an assembled structural framing cassette of the present invention. In such embodiments, a glazing panel could be equipped with a frame or other member through which a fastener can be attached into or through to affix it to the rafter and/or purlin. In an embodiment, it takes less than thirty minutes to glaze five panels 150, fasten the pressure plates 160, and install wire chase covers 170 in the structural framing cassette 100 of the present invention. Each structural framing cassette 100 of the present invention has a desired number of panels 150 wired in series to form one electrical string of solar panels 150. Solar panels 150 are not required to be used in all cassette bays. Some (or all bays) can be filled with different materials (e.g., glass, plastic, metal, composite material, etc.). The assembled structural framing cassette 200 is designed for easy and safe repair or replacement of a single glazing panel 150 positioned anywhere in the array because the glazing panel 150 can be removed from the underside of the cassette 200, without the need for a machine or person removing the glazing panel 150 from above.

Figure 6:
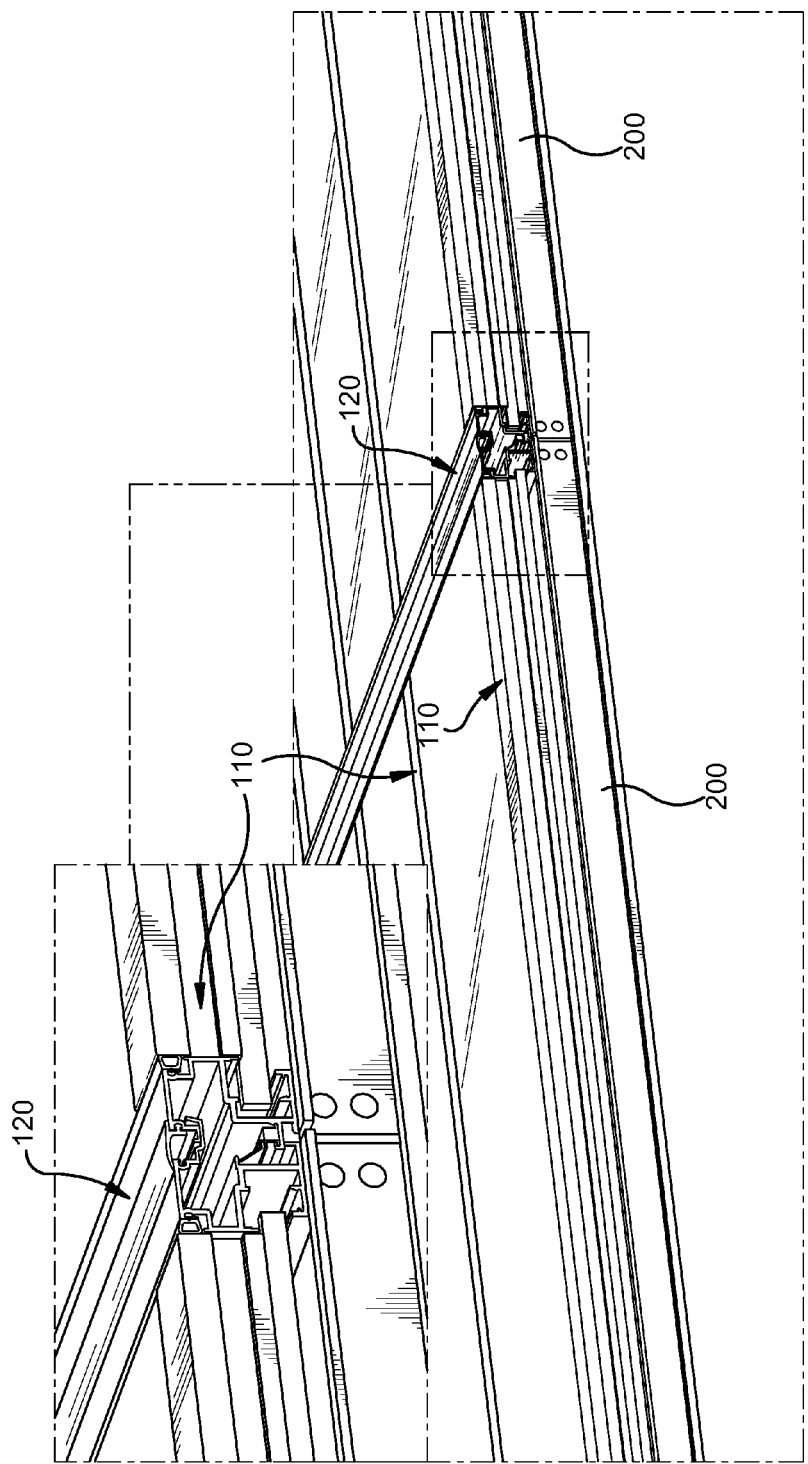
FIG. 6 shows two assembled structural framing cassettes joined together.
Figure 7:
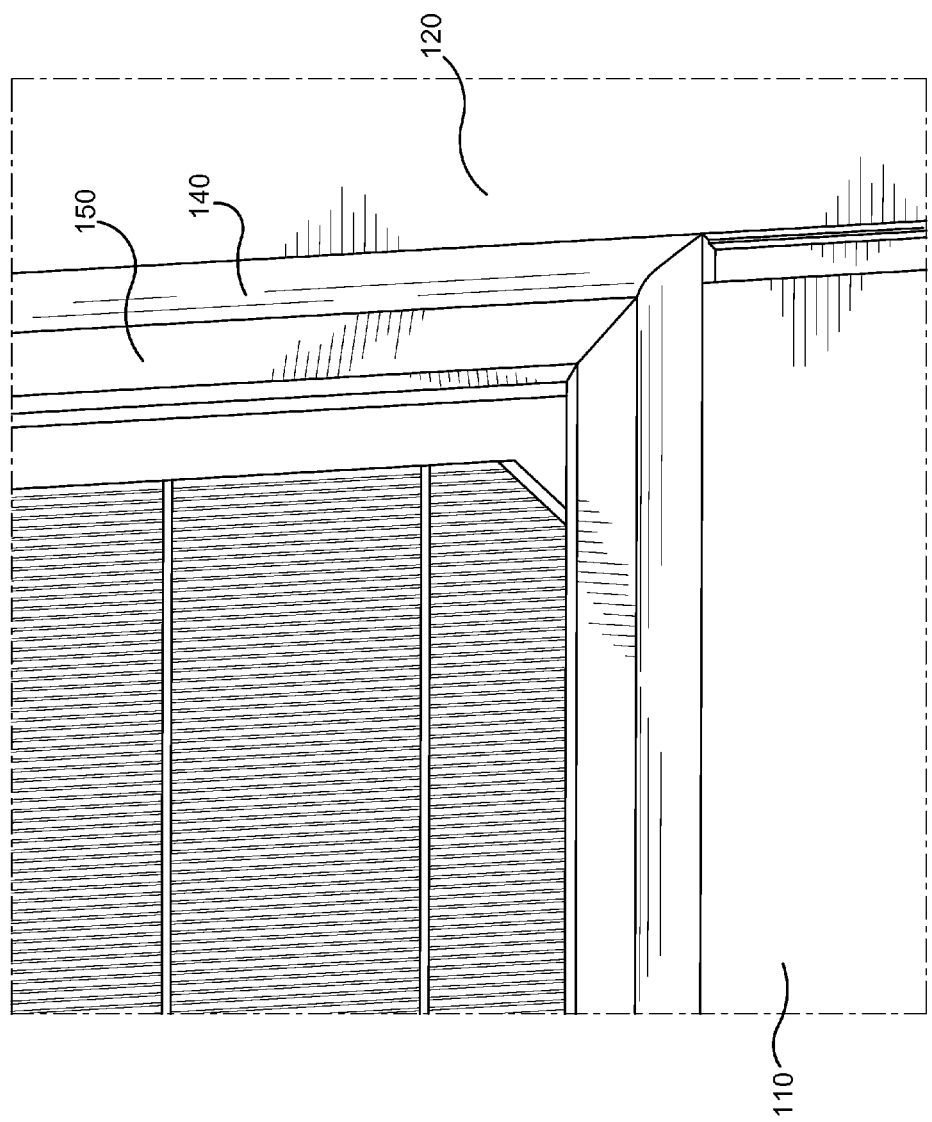
FIG. 7 shows a close-up view of the assembled structural framing cassette of FIG. 5. In this embodiment, connectors and/or sealing components are employed to secure the panels and to minimize infiltration of moisture, air, dust, and other elements, from the outside to the inside of the glazing pockets.
Figure 8:
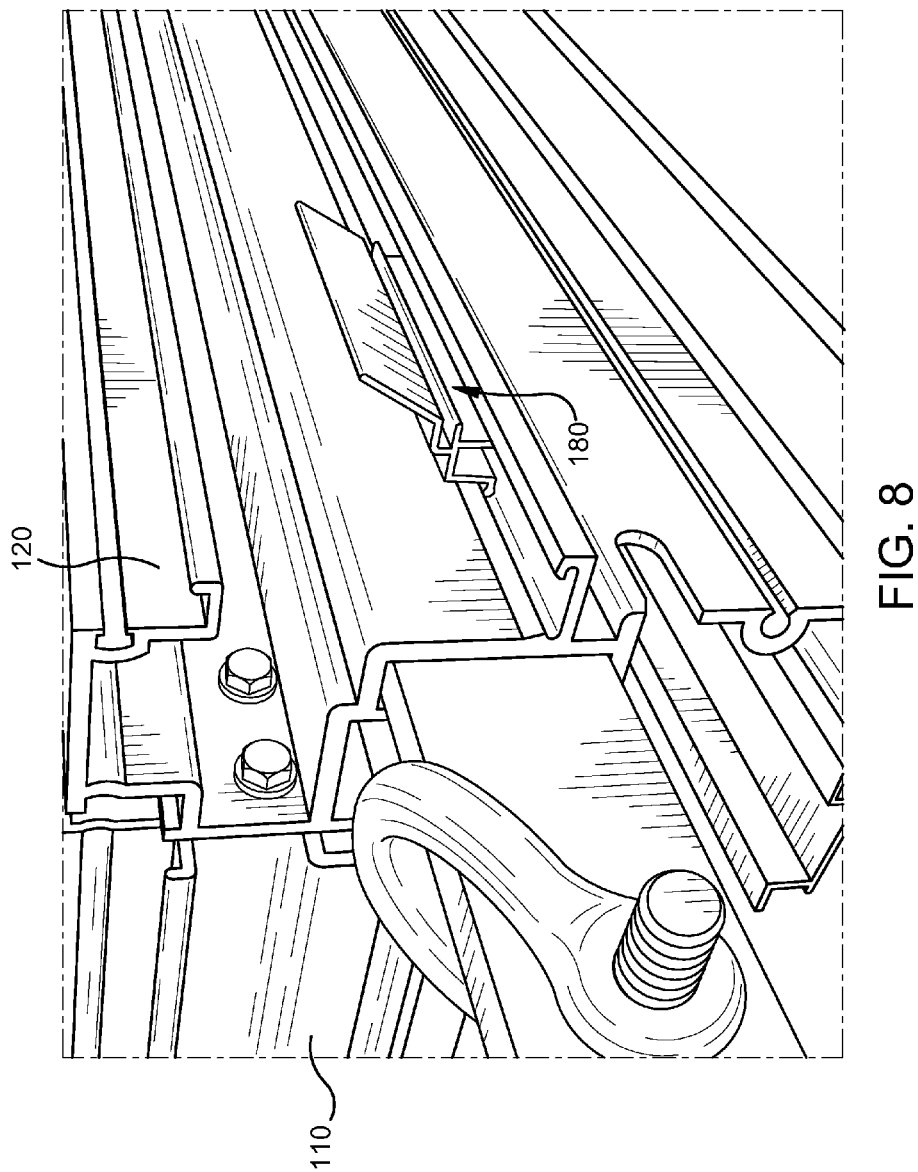
FIG. 8 and FIG. 9 show close-up views of the assembled structural framing cassette of FIG. 2.
Figure 9:
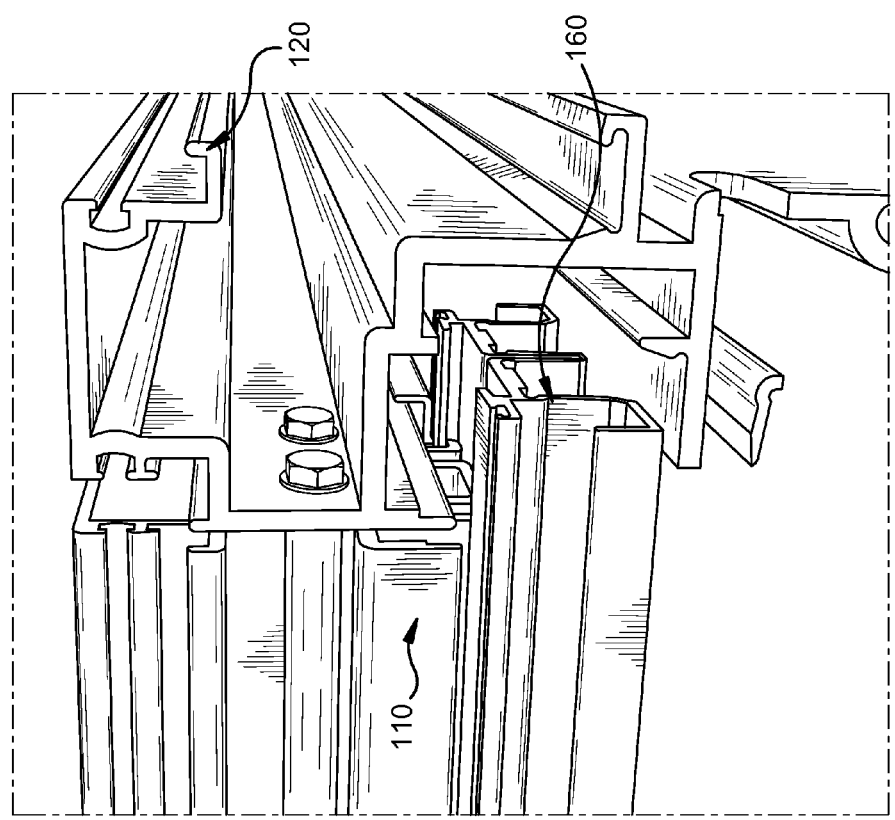

FIG. 6 illustrates two assembled structural framing cassettes 200 joined together forming an embodiment of a unitized overhead glazing system of the present invention. Finishes and trim elements can be changed to match or compliment the architectural aluminum system on a building or achieve other desired outcomes. Quick connect anchor clips that attach the rafters 120 of each assembled structural framing cassette 200 to a substructure can be used for dead load and also accommodate thermal expansion. FIG. 7 shows a close-up view of the assembled structural framing cassette 200 of FIG. 5. In the embodiment shown in FIG. 7, connectors and/or sealing components 140 are employed to secure the panels and to minimize infiltration of moisture, air, dust, and other elements, from the outside to the inside of the glazing openings 130. It should be noted that not all embodiments of the present invention require the use of a sealing component for weather sealing purposes. In an embodiment, it may be desirable to fill the joint between the purlin 110 and the rafter 120 using, for example, a gray silicone and backer rod. FIG. 8 and FIG. 9 show close-up views of the assembled structural framing cassette 200 of FIG. 5. As illustrated in FIG. 8, in an embodiment an alignment clip 180 is used to facilitate the proper engagement of assembled structural framing cassettes 200 relative to each other. An optional water gutter can be installed at the low or sill end of the rafter, as illustrated in FIG. 8. The reverse pressure plate 150 is fastened to the underside of the purlins 110.

FIG. 10 is a schematic, perspective illustration of a unitized overhead glazing system 500 of the present invention. In the embodiment shown in FIG. 10, the unitized overhead glazing system 500 includes an array of assembled structural framing cassettes, each having seven photovoltaic modules, engaging a substructure 600 via anchors 620. The unitized overhead glazing system 500 is depicted as being of the single-slope type, although this configuration is not limiting to the present invention. Each cassette forms one electrical string and is pre-wired and tested prior to shipping. The unitized overhead glazing system 500 can be utilized to generate electricity, provide shade, collect water, reduce heat island effect, provide more controlled lighting and support infrastructure for vehicles, for example, plug-in vehicles. The unitized overhead glazing system 500 can be utilized to generate electricity, provide shade, collect water, reduce heat island effect, provide more controlled lighting and support infrastructure for plug-in vehicles.

The unitized overhead glazing system 500 is designed to be installed and maintained from below, eliminating safety concerns associated with conventional canopies where work must be performed while on top of the canopy. The unitized overhead glazing system 500 incorporates unique sealing methods and components to manage water, limit debris build up, and maximize energy yield. If a glazing panel needs to be removed from any of the cassettes, anywhere in the array, this step can be performed from below, eliminating safety concerns associated with conventional canopies where work must be performed while on top of the canopy. A kit of components can be supplied for replacing a first glazing panel of an assembled structural framing cassette of the unitized overhead glazing system 500, the kit of components including a replacement glazing panel approximately the same size and shape as the first glazing panel so as to fit within a first glazing opening of the assembled structural framing cassette holding the first glazing panel, wherein the first glazing panel is held in place in the first glazing opening using at least one reverse pressure plate fastened to a lower surface of the purlin forming the first glazing opening; and a plurality of retainer clips for engaging those framing members that form the first glazing opening, the plurality of retainer clips providing support to the replacement glazing panel during installation of the replacement glazing panel in the first glazing opening.

The substructure 600 has a pitch or slope of any suitable grade, e.g. from about 2° to about 30° as measured from the horizontal plane of the ground or surface for which the substructure 600 is erected. In an embodiment, the substructure 600 has a pitch or slope from about 5° to about 10° as measured from the horizontal plane of the ground or surface for which the substructure 600 is erected. The assembled structural framing cassettes have a unique reverse pressure plate/flush mount design as described above. In an embodiment, the structural framing cassettes fabricated at the shop can be transported to the project site, lifted by rigging attached to the cassette and to a crane or other lifting device, and set into place on the substructure 600. The rigging can be attached to the four lifting lugs temporarily engaged and locked into place within the slots in the rafter. In an embodiment, no separate lifting device is needed. Once the structural framing cassettes are set onto the substructure 600, the structural framing cassettes can be fastened permanently into place and electrically connected. In an embodiment, screw splines are used to fasten various components together. In an embodiment, non-traditional fastening solutions such as blind rivets are used to fasten various components together. These non-traditional fastening solutions may improve strength, bonding, assembly time, corrosion resistance, security, etc. of the structural framing cassette. Additional trim pieces are added as desired. In an embodiment, bulb, wedge, or flap gaskets (formed or cut), expanding foam tape, or other materials, are used to seal adjacent structural framing cassettes or glazing panels. The structural framing cassette design enables electrical bonding to be achieved by every conductive member of the system 500 being bonded to another. This limits the amount of labor and materials otherwise required for electrical grounding.

In an embodiment, a substructure holding a unitized overhead glazing system of the present invention could be designed to also support an electric charging apparatus for batteries and/or mobile equipment including automobiles, bicycles, and other forms of transportation. In an embodiment, at least one structural framing cassette of the present invention can be used in a single axis or a dual axis tracking system designed to optimize the harvest of solar radiation. In an embodiment, a protective coating, such as Alcoa's Dura-Bright™ coating, can be added to rafters and/or purlins of a structural framing cassette of the present invention to improve its appearance and ability to (self) clean. In an embodiment $TiO_2$ and/or other coatings can be applied to help aid (self) cleaning of solar panels, which can improve the cleanliness and thus the performance of the panel. In an embodiment, aluminized paint or other reflective surfaces can be installed below the glazing panels and/or coatings can be applied to the surfaces below the glazing panels to increase reflected light and thus improve energy generation. In an embodiment, a water line that runs along the head or high end of each structural framing cassette is installed to distribute water so dust and debris can be easily flushed off of the structural framing cassettes and energy generation can be improved. In an embodiment, a unitized overhead glazing system of the present invention can be used to collect and recover rain water. In an embodiment, LED or other lighting apparatus can be installed directly below a glazing panel and operated or installed in manner to generate a desired image, effect, message, or other outcome.

In an embodiment, a structural framing cassette of the present invention can be modified such that the structural framing cassette can be installed in a configuration different then what is shown in FIG. 10. In an embodiment, a structural framing cassette of the present invention is modified such that the structural framing cassette can be installed in a configuration approximately 90° to what is shown in FIG. 10. In such an application, the structural framing cassette rafters are approximately parallel to and directly above the purlins of the substructure which can provide more points or even continuous support. The integrated wire chases within the rafters are used as described above, and the exit wiring at the end of each structural framing cassette is installed in a wire chase above the trusses of the substructure. In an embodiment, rafters are affixed directly to substructure purlins in the shape of wide flange beams with fasteners. In an embodiment, rafters are affixed directly to substructure purlins of other profiles using anchors. In an embodiment a low profile gasket is set into a recess extruded or formed in the rafter so the gasket's top or outside surface is flush with the adjacent materials. This can help ensure flow of water and debris over the seams between individual structural framing cassettes. In an embodiment, fasteners are used to attach one structural framing cassette rafter to another. In an embodiment, the structural framing cassette structure could be directly integrated with and into the substructure purlins.

While illustrative embodiments of the invention are disclosed herein, it will be appreciated that numerous modifications and other embodiments may be devised by those skilled in the art.

What is claimed is:

1. A method for replacing a first glazing panel of an assembled structural framing cassette comprising:
   providing a replacement glazing panel,
      wherein the assembled structural framing cassette includes a plurality of horizontal framing members interconnected with two vertical framing members to provide at least five glazing openings each capable of holding a glazing panel,
      wherein the replacement glazing panel is approximately same size and shape as the first glazing panel so as to fit within a first glazing opening holding the first glazing panel,
      wherein the assembled structural framing cassette engages a substructure, and
      wherein the assembled structural framing cassette has a clearance height of at least about seven feet above a surface level for which the substructure is erected;
   providing a plurality of retainer clips;
   detaching at least one reverse mounted pressure plate from the first glazing opening, wherein the reverse mounted pressure plate is detached from a lower surface of the horizontal framing member forming the first glazing opening;
   removing the first glazing panel from the first glazing opening;
   engaging the plurality of retainer clips to those framing members that form the first glazing opening so as to provide a support for the replacement glazing panel during installing of the replacement glazing panel in the first glazing opening; and
   installing the replacement glazing panel in the first glazing opening so as to replace the first glazing panel of the assembled structural framing cassette.

2. The method of claim 1 further comprising:
   attaching a reverse mounted pressure plate to the first glazing opening holding the replacement glazing panel.

3. The method of claim 1 wherein at least one of the first glazing panel or the replacement glazing panel is a solar panel.

4. The method of claim 1 wherein at least one of the first glazing panel or the replacement glazing panel is an aluminum composite panel.

5. The method of claim 1 wherein each of the detaching, removing, engaging and installing steps are performed from an underside of the assembled structural framing cassette.

6. The method of claim 1 wherein prior to installing the replacement glazing panel in the first glazing opening, the method further comprises positioning a weather seal gasket around the first glazing opening.

7. The method of claim 6 wherein a topside of the assembled structural framing cassette having the weather seal gasket and the replacement glazing panel provides a flush exterior weather seal.

8. The method of claim 1 wherein at least one of the horizontal framing members or the vertical framing members of the assembled structural framing cassettes are made from a material selected from the group consisting of formed or rolled steel, stainless steel, extruded aluminum, aluminum alloys, wood, plastic, composite materials, and combinations thereof 9. The method of claim 1 wherein the assembled structural framing cassette includes a plurality of horizontal framing members interconnected with two vertical framing members to provide at least six glazing openings.

10. The method of claim 1 wherein the assembled structural framing cassette includes a plurality of horizontal framing members interconnected with two vertical framing members to provide at least seven glazing openings.

11. The method of claim 1 wherein the substructure has a slope as measured from a horizontal plane of the surface level for which the substructure is erected.

12. The method of claim 1 wherein the assembled structural framing cassette has a clearance height of about sixteen feet above the surface level for which the substructure is erected.

13. The method of claim 1 wherein the assembled structural framing cassette is part of a unitized overhead glazing system that includes a plurality of structural framing cassettes.

14. A method for replacing a first glazing panel of a unitized overhead glazing system, the unitized overhead glazing system including at least ten assembled structural framing cassettes, the method comprising:
  providing a replacement glazing panel,
    wherein the replacement glazing panel is approximately same size and shape as the first glazing panel so as to fit within a first glazing opening of one of the assembled structural framing cassettes holding the first glazing panel,
    wherein each of the assembled structural framing cassettes includes a plurality of horizontal framing members interconnected with two vertical framing members to provide at least five glazing openings,
    wherein the unitized overhead glazing system engages a substructure, and
    wherein the unitized overhead glazing system has a clearance height of at least about seven feet above a surface level for which the substructure is erected;
  providing a plurality of retainer clips;
  detaching at least one reverse mounted pressure plate from the first glazing opening, wherein the reverse mounted pressure plate is detached from a lower surface of the horizontal framing member forming the first glazing opening;
  removing the first glazing panel from the first glazing opening;
  engaging the plurality of retainer clips to those framing members that form the first glazing opening so as to provide a support for the replacement glazing panel during installing of the replacement glazing panel in the first glazing opening; and
  installing the replacement glazing panel in the first glazing opening so as to replace the first glazing panel.

15. The method of claim 14 wherein each of the assembled structural framing cassettes is at least about five feet wide and at least about 15.5 feet long.

16. The method of claim 15 wherein each of the assembled structural framing cassettes are engaged to each other to create a unitized overhead glazing system that is at least about fifty feet wide and at least about 15.5 feet long.

17. The method of claim 14 wherein at least one of the first glazing panel or the replacement glazing panel is a solar panel.

18. The method of claim 14 wherein prior to installing the replacement glazing panel in the first glazing opening, the method further comprises positioning a weather seal gasket around the first glazing opening.

19. The method of claim 18 wherein a topside of the assembled structural framing cassette having the weather seal gasket and the replacement glazing panel provides a flush exterior weather seal.

\* \* \* \* \*